UNITED STATES PATENT OFFICE.

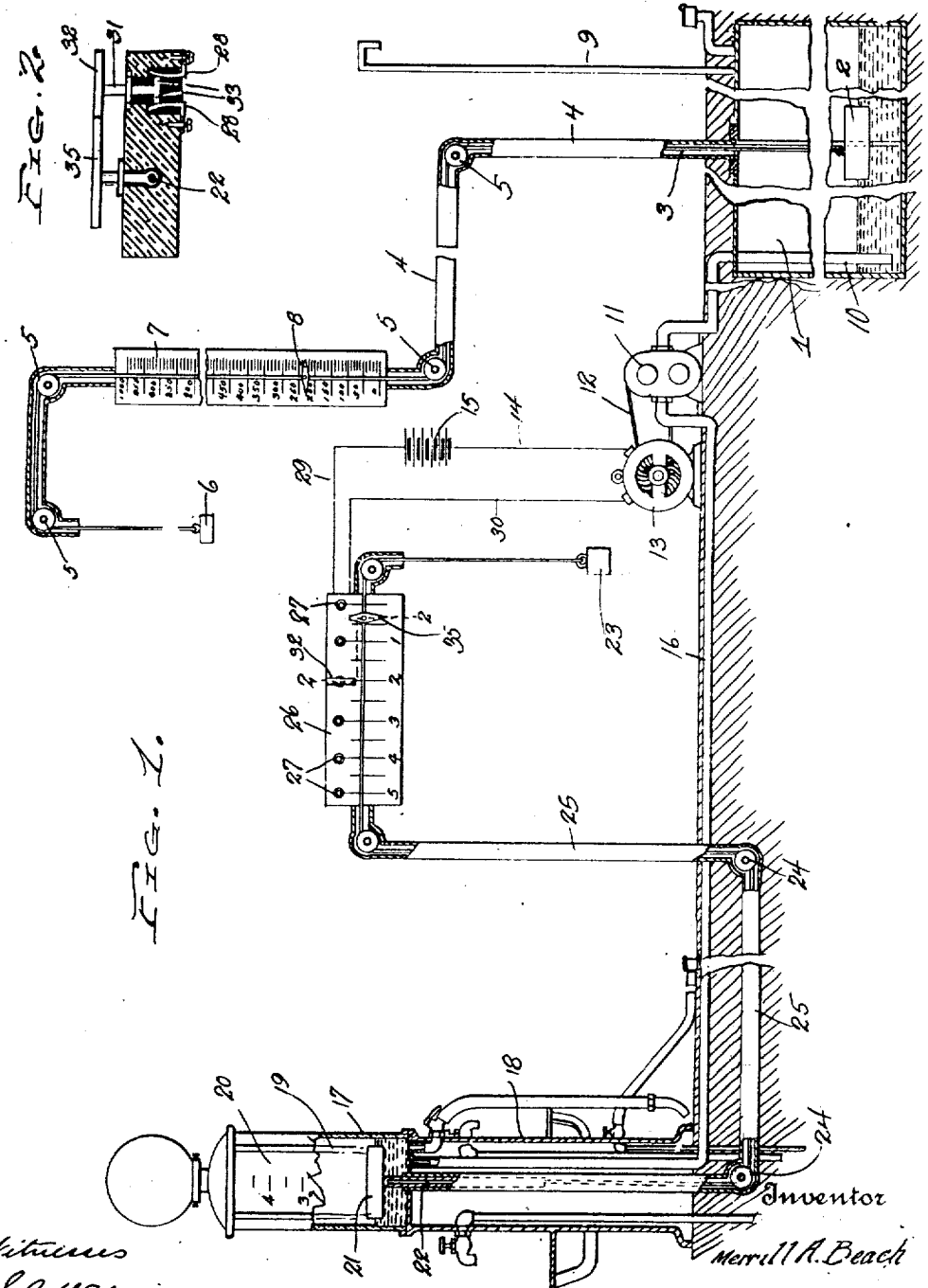

MERRILL A. BEACH, OF PENN YAN, NEW YORK.

LIQUID-DISPENSING APPARATUS.

1,309,505.   Specification of Letters Patent.   Patented July 8, 1919.

Application filed April 28, 1919. Serial No. 293,103.

*To all whom it may concern:*

Be it known that I, MERRILL A. BEACH, a citizen of the United States, residing at Penn Yan, in the county of Yates and State of New York, have invented certain new and useful Improvements in Liquid-Dispensing Apparatus, of which the following is a specification.

This invention relates to liquid dispensing apparatus and more particularly to an improved device for the purpose of dispensing gasolene in garages, public service stations, and at other points at which automobilists may stop to secure quantities of gasolene.

One of the objects of the invention is to provide an improved apparatus which will automatically dispense predetermined quantities of the gasolene.

A further object of the invention is to provide an apparatus which may be employed to forcibly eject the gasolene from the source of supply and which will employ electrical apparatus to control the quantity of gasolene dispensed.

The above and additional objects are accomplished by such means as are illustrated in the preferred embodiment and accompanying drawings, wherein like characters of reference denote like or corresponding parts throughout the several views, in which:—

Figure 1 is a side view of the apparatus constructed in accordance with my invention, showing the same partially diagrammatically, parts being broken away to more clearly indicate the construction.

Fig. 2 is a section taken approximately on the line 2—2 of Fig. 1.

Referring to the drawing, wherein is illustrated the preferred form of my invention, in which like numerals of reference indicate like or corresponding parts throughout the several views, a supply tank 1 is buried in the ground in the usual manner and contains a large quantity of gasolene and this tank may be of any preferred size in a manner common to storage tanks of this character; a float 2 is provided in the storage tank and is sufficiently buoyant to rise and fall as the level of gasolene in the storage tank varies. This float 2 is connected to a cable or flexible element 3 which passes through pipes 4 to protect the cable and to assure proper movement thereof during inclement weather. This cable also passes over guide pulleys 5 mounted at intervals in the pipe 4 and has a weight 6 attached to its free end, the weight being disposed so as to be suspended by the cable from one of the pulleys 5 which is held in an elevated position. This weight 6 is light in comparison with the weight of the float 2 and is merely heavy enough to maintain the cable or flexible element 3 under proper tension. A scale 7 attached to one of the pipes is graduated and provided with numerals and the cable carries a pointer 8 which indicates the graduations on the scale as the float 2 varies in position with the changing level of gasolene in the storage tank 1. An air vent pipe 9 is attached to the storage tank and projects considerably above the ground level to supply air to the tank.

A supply pipe 10 has one end submerged in the gasolene in the storage tank and its opposite end connected to a pump 11, which is operated by a belt 12 driven from a motor 13 which motor is connected by a conductor 14 to a suitable point. From the opposite side of the pump 11 the supply pipe 16 extends to the auxiliary supply receptacle indicated generally at 17. This receptacle is mounted upon a standard 18 and comprises the container 19 adapted to contain a relatively large quantity of gasolene and which may be supplied with a glass panel 20 if so desired. This receptacle is also provided with a float 21 connected by a flexible cable 22 to a small weight 23; this cable 22 passes over pulleys 24 arranged in a system of piping 25 which leads from the interior of the receptacle 19 to a register board or panel 26. This board or panel is disposed so that the cable 22 passes over its base longitudinally as shown to advantage in Fig. 1 and this board has its face graduated to indicate the gallons and half gallons as shown. Obviously the board may be of any desired length and the graduations may be carried out as far as is desired. A plurality of openings 27 are provided in the board at the graduation which indicates each gallon, and each opening is provided on its interior with spaced apart contact members 28 as in Fig. 2. These members 28 have their ends exposed on the back of the board and are connected in series through a conductor 29 leading to the source of current 15 and by another conductor 30 leading to the motor 13. A removable rotatable plug 31 is adapted to be inserted in any of the openings and this plug is provided on its outer end with an arm 32 which is disposed at right angles to the longitudinal edge of the board when the plug is in operative position as indicated in Fig. 1. The inner end of the plug 31 has oppositely projecting fingers 33 which are adapted to engage the contact 28 in order that the circuit will be completed. Obviously a turning movement of the plug will cause the finger 33 to disengage the contact members 28 and consequently break the circuit. The flexible cable or cord 22 is provided with a pointer or indicator 35 which moves with the cable across the board 26 as the float 22 varies or changes its position in the receptacle 19. This indicator 35 is adapted to engage the arm 32 of the rotatable plug so that the same will be turned for breaking the circuit.

Assuming that a person desires to secure a quantity of gasolene, the plug will be inserted in the opening having the numeral corresponding to the number of gallons desired. In Fig. 1 the plug is illustrated as being disposed in the opening for two gallons. This insertion of the plug with the arm 32 extending transversely with respect to the board 26 completes the circuit and starts the motor 13 whereupon the pump 11 is actuated for pumping the gasolene from the storage tank to the auxiliary supply tank 19 through the pipes 10 and 16. As the gasolene enters the receptacle 19 the float 21 rises therein and exerts a pull on the cable 22 thus causing the indicator 35 to move across the board until one end of the indicator engages the arm 32 and turns or rotates the rotatable plug 31, causing the fingers 33 of the plug to disengage the contact members and thereby breaking the circuit whereupon the pump immediately stops. No more gasolene can be secured until the plug is again inserted in the opening for causing the circuit to be closed across the contact member 28.

The foregoing description and accompanying drawings have reference to what might be considered to be the approved or preferred form of my invention. I desire it to be understood that I may make such changes in the construction, combination and arrangement of parts, materials, dimensions, et cetra, as may prove expedient and fall within the scope of the appended claims.

Having thus fully described my invention what I claim as new and desire to secure by Letters Patent, is:—

1. The combination with a liquid supply tank and an auxiliary receptacle having a float arranged therein and a cable connected to the float and provided with an indicator member movable with the cable when the float is actuated, of an electrically operated pump having connection with the said supply tank and adapted to supply liquid to the said auxiliary receptacle, and an indicator board provided with normally open contacts at regular intervals throughout the length of the board, a switch plug adapted for insertion in the board to engage any pair of contact members and adapted for rotation for disengaging the members, the said cable being disposed on the said board and movable across the same to guide the said indicator when the cable is moved for engaging the said rotatable plug to automatically actuate the plug during a predetermined limited movement of the said cable across the board, whereby the said electrically operated pump will be deënergized.

2. The combination with a supply tank, an auxiliary receptacle and an electrically operated pump connected to the supply tank and the said receptacle, the latter having a buoyant float mounted therein, of a switch board provided with a plurality of regularly spaced openings having contacts arranged therein normally open, an electric circuit connected in series to the said contact members and adapted to energize the said pump when the circuit is closed, a removable rotatable plug provided with projecting fingers adapted to engage the said contact members to close the circuit, the said plug having an arm normally exposed above the board, and means connected to the float in the auxiliary receptacle and movable across the board to engage the said arm for imparting rotary movement to the arm when the said float has moved a predetermined distance in the said receptacle to cause the plug to rotate for disengaging the said contact members whereby the said electrically operated pump will be deënergized.

3. An apparatus of the character described comprising a receptacle having a float movable therein and equipped with a flexible cable provided with an indicator, a switchboard, electrically operated means for supplying liquid to the said receptacle and including a normally open circuit, the said switch board having openings at regular intervals, contact members mounted in the openings and connected with the circuit to normally maintain the circuit open, and a removable switch plug adapted to be inserted in any of the openings and provided with fingers engageable with a pair of the said contacts in the openings when the switch plug is disposed in one position, the said indicator on the cable being engageable with the switch plug to move the latter when the cable has traveled a predetermined distance whereby the said switch plug may be moved for disengaging the said fingers from the contact members to open the said circuit.

In testimony whereof I affix my signature in presence of two witnesses.

MERRILL A. BEACH.

Witnesses:
 JOHN E. WATKINS,
 J. HARVEY PURDY.